United States Patent [19]

Toy

[11] 4,314,350
[45] Feb. 2, 1982

[54] SELF-CHECKING ARITHMETIC UNIT

[75] Inventor: Wing N. Toy, Glen Ellyn, Ill.

[73] Assignee: Bell Telephone Laboratories, Incorporated, Murray Hill, N.J.

[21] Appl. No.: 108,363

[22] Filed: Dec. 31, 1979

[51] Int. Cl.³ .............................................. G06F 11/14
[52] U.S. Cl. .................................................... 364/740
[58] Field of Search ................................. 364/740, 741

[56] References Cited

U.S. PATENT DOCUMENTS

| | | | |
|---|---|---|---|
| 2,861,744 | 11/1958 | Schmitt et al. | 364/740 |
| 3,660,646 | 5/1972 | Minero et al. | 364/740 |
| 3,829,668 | 8/1974 | Naumi et al. | 364/741 X |
| 3,846,626 | 11/1974 | Yoshida | 364/740 |

*Primary Examiner*—David H. Malzahn
*Attorney, Agent, or Firm*—Peter Visserman

[57] ABSTRACT

A circuit for the detection of errors in single and double word arithmetic logic unit operations.

A microprogram processor achieves self-checking of arithmetic logic unit functions by performing single-word operations in the duplex mode and double-word operations in the simplex mode. The double-word operation is checked by performing the operation twice, generating a parity bit for each output word and comparing the parity bits generated for the two operations.

7 Claims, 14 Drawing Figures

CLOCK 1
CLOCK 2
CLOCK 3

FIG. 4

| | 1 | 2 | 3 | 4 | 5 | 6 | 7 | 8 | 9 | 10 | 11 | 12 | 13 |
|---|---|---|---|---|---|---|---|---|---|---|---|---|---|
| | NEXT ADDRESS | SELECTION OF MICRO ADDRESS | FUNCTION FOR ALU/RAM 102 | A ADDRESS FOR ALU/RAM 102 | B ADDRESS FOR ALU/RAM 102 | FUNCTION FOR ALU/RAM 103 | A ADDRESS FOR ALU/RAM 103 | B ADDRESS FOR ALU/RAM 103 | U46 U47 | U48 U49 | CU0 | CU1 CU2 READ | WRITE |
| | U7→U0 | U9 U8 | U18→U10 DEST CONTR / ALU FUNCT / ALU SOURCE | U22→U19 | U26→U23 | U37→U27 DEST CONTR / ALU FUNCT / ALU SOURCE | U41→U38 | U45→U42 | | | | | |
| 400 | 000 | 00 | 3 / 0 / 1 | 00 | 01 | 3 / 0 / 1 | 00 | 01 | 0 / 0 | 0 / 1 | 0 | 0 / 0 | 0 |
| 402 | 001 | 00 | 3 / 0 / 1 | 12 | 14 | 3 / 0 / 1 | 13 | 15 | 1 / 0 | 0 / 0 | 1 | 1 / 0 | 1 |
| 403 | 002 | 00 | 3 / 0 / 1 | 13 | 15 | 3 / 0 / 1 | 12 | 14 | 0 / 1 | 1 / 0 | 0 | 0 / 0 | 0 |

FIG. 5

FIG. 8
ALU DESTINATION CONTROL

| MICRO CODE | | | OCTAL CODE | RAM FUNCTION | | DATA OUT | RAM SHIFTER | |
|---|---|---|---|---|---|---|---|---|
| $I_8$ | $I_7$ | $I_6$ | | SHIFT | LOAD | | $RAM_0$ $L0/R1$ | $RAM_3$ $L1/R0$ |
| L | L | H | 0 | SHIFT | — | F | X | X |
| L | L | H | 1 | — | — | F | X | X |
| L | H | L | 2 | NONE | ALU $(F_i)$ | A | X | X |
| L | H | H | 3 | NONE | ALU $(F_i)$ | F | X | X |
| H | L | L | 4 | LEFT (DOWN) | ALU $(F_i+1)$ | F | $F_0$ | $IN_3$ |
| H | L | H | 5 | LEFT (DOWN) | ALU $(F_i+1)$ | F | $F_0$ | $IN_3$ |
| H | H | L | 6 | RIGHT (UP) | ALU $(F_i-1)$ | F | $IN_0$ | $F_3$ |
| H | H | H | 7 | RIGHT (UP) | ALU $(F_i-1)$ | F | $IN_0$ | $F_3$ |

X = DON'T CARE

FIG. 6
ALU SOURCE OPERAND CONTROL

| MICRO CODE | | | OCTAL CODE | ALU SOURCE OPERANDS | |
|---|---|---|---|---|---|
| $I_2$ | $I_1$ | $I_0$ | | R | S |
| L | L | H | 1 | A | B |
| L | H | H | 3 | 0 | B |
| H | L | L | 4 | 0 | A |
| H | L | H | 5 | D | A |
| H | H | H | 7 | D | 0 |

FIG. 7
ALU FUNCTION CONTROL

| MICRO CODE | | | OCTAL CODE | ALU FUNCTION | SYMBOL |
|---|---|---|---|---|---|
| $I_5$ | $I_4$ | $I_3$ | | | |
| L | L | L | 0 | R PLUS S | R + S |
| L | L | H | 1 | S MINUS R | S − R |
| L | H | L | 2 | R MINUS S | R − S |
| L | H | H | 3 | R OR S | R ∨ S |
| H | L | L | 4 | R AND S | R ∧ S |
| H | L | H | 5 | $\bar{R}$ AND S | $\bar{R}$ ∧ S |
| H | H | L | 6 | R EX-OR S | R ⊻ S |
| H | H | H | 7 | R EX-NOR S | $\overline{R \veebar S}$ |

FIG. 9
SOURCE OPERAND AND ALU FUNCTION MATRIX

| $I_{543}$ OCTAL | ALU FUNCTION | | $I_{210}$ OCTAL → ALU SOURCE | 1 | 3 | 4 | 5 | 7 |
|---|---|---|---|---|---|---|---|---|
| | | | | A, B | 0, B | 0, A | D, A | D, 0 |
| 0 | R PLUS S | $C_n=L$ | | A+B | B | A | D+A | D |
| | | $C_n=H$ | | A+B+1 | B+1 | A+1 | D+A+1 | D+1 |
| 1 | S MINUS R | $C_n=L$ | | B−A−1 | B−1 | A−1 | A−D−1 | −D−1 |
| | | $C_n=H$ | | B−A | B | A | A−D | −D |
| 2 | R MINUS S | $C_n=L$ | | A−B−1 | −B−1 | −A−1 | D−A−1 | D−1 |
| | | $C_n=H$ | | A−B | −B | −A | D−A | D |
| 3 | R OR S | | | A∨B | B | A | D∨A | D |
| 4 | R AND S | | | A∧B | 0 | 0 | D∧A | 0 |
| 5 | R̄ AND S | | | Ā∧B | B | A | D̄∧A | 0 |
| 6 | R EX-OR S | | | A⊻B | B | A | D⊻A | D |
| 7 | R EX-NOR S | | | $\overline{A \veebar B}$ | B̄ | Ā | $\overline{D \veebar A}$ | D̄ |

+ = PLUS, − = MINUS, ∨ = OR, ∧ = AND, ⊻ = EX-OR

SELF-CHECKING ARITHMETIC UNIT

TECHNICAL FIELD

This invention relates to arithmetic logic units in data processors and particularly, to error detection circuits for use with arithmetic logic units which perform single-word and double-word operations.

BACKGROUND OF THE INVENTION

One prior art application of arithmetic logic units which perform single-word and double-word operations is a data processor using single-word length data words and double-word length memory address. In one step, such a data processor performs an arithmetical logic operation, such as addition, by adding two registers together and storing the result in one of the registers. The processor performs memory address calculations in two steps using address information stored in pairs of registers. If the address calculation involves adding two addresses together, the first step requires the registers in each pair which contain the least significant address bits be added together and the result be stored into one of the registers. The second step requires the registers of each pair which contain the most significant address bits be added together and the result be stored into one of the registers. The resulting address from the calculation is not available for accessing a memory unit until the second calculation has been performed.

U.S. Pat. No. 3,660,646 teaches a method for error detection which is simply to do the calculations twice and compare the stored data results. However, this error detection approach suffers from the problem that the address is not available for accessing the memory until after two calculations, and the same arithmetic unit is used to check itself. Another error detection method known in the prior art is to fully duplicate the registers and arithmetic unit in the processor and to do the two address calculations in parallel with respect to both sets of registers and ALUs. This approach doubles the amount of circuitry required.

SUMMARY OF THE INVENTION

In accordance with this invention, a processor comprises an arithmetic logic unit (ALU)/register unit which performs arithmetic operations on identical first and second double-word operands, each having a least significant word and a most significant word, stored internally, an error word generating circuit connected to the ALU/register unit, and a comparator circuit. In response to a first control signal, the ALU/register unit performs an arithmetic operation on the least significant word of the first operand and on the most significant word of the second operand and generates corresponding first and second output words. The error word generating circuit responds to the first and second output words by generating first and second error words, respectively. In response to a second control signal, the ALU/register unit performs an arithmetic operation on the most significant word of the first operand and on the least significant word of the second operand and generates corresponding third and fourth output words. The error word generating circuit responds to the third and fourth output words by generating third and fourth error words, respectively. Also, in response to the second control signal, the comparator circuit compares the first and third error words and compares the second and fourth error words, and the comparator circuit generates an error signal if a mismatch occurs in either of these comparisons. Furthermore, each double-word operand is stored in a different set of word registers within the ALU/register unit. In accordance with another aspect of the invention, there are two ALUs which perform the arithmetic operations; and each ALU is connected to a different set of word registers. Furthermore, the processor has a carry multiplexor for interconnecting the carry input and carry output terminals of the two ALUs such that either ALU can operate on the least significant or most significant word during an arithmetic operation. Furthermore, the carry multiplexor comprises two data selectors; and each data selector interconnects one ALU's carry out terminal to the other ALU's carry input terminal. In accordance with another aspect of the invention, the error word generating circuit comprises two error word generators, and each error word generator generates an error word for the results of one ALU. Furthermore, the error word generators may be parity generators, and the error words comprise only one bit.

DETAILED DESCRIPTION

Figure 1:
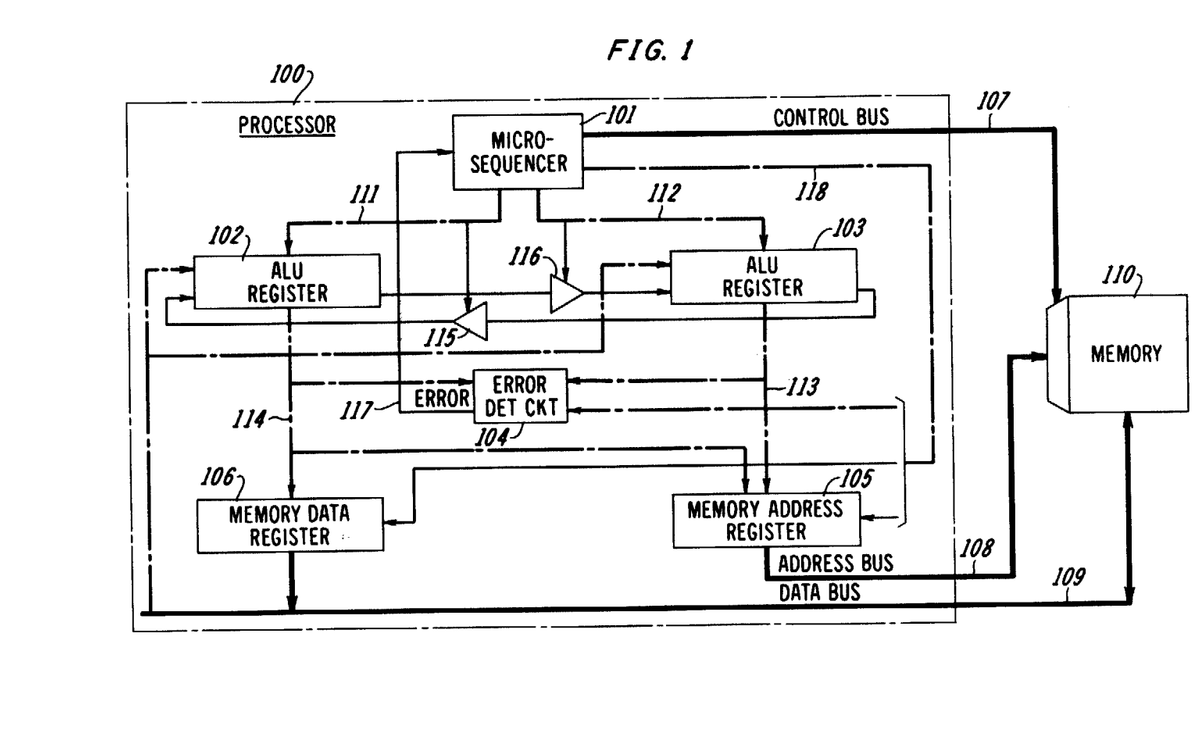
FIG. 1 is a block diagram of a data processing system having a processor for performing self-checked arithmetic logic operations in accordance with the invention.

An illustrative system including a circuit in accordance with the invention for detecting errors in an arithmetic logic unit is shown in block diagram form in FIG. 1. The system comprises processor 100 which communicates with memory 110 via control bus 107, address bus 108, and data bus 109. Processor 100 comprises microsequencer 101 which provides the necessary control signals for the processor operations by execution of an internally stored microprogram. Processor 100 also comprises duplicated ALU/registers 102 and 103. Each ALU/register contains an arithmetic logic unit, a set of general purpose registers and control decoders. The control decoders are responsive to signals from microsequencer 101 to transfer data from the general purpose registers to the arithmetic logic unit, to control the arithmetic logic unit, and to transmit the results of an arithmetic or logic operation to a specified destination register within the set of general purpose registers or to an external destination register. The arithmetic logic units in ALU/registers 102 and 103 are used to perform all data manipulations and to compute addresses for memory operations. For the purposes of this description, it is assumed that data is composed of one word and that addresses are composed of two words and stored in pairs of general purpose registers.

To write a word into memory 110, processor 100 transmits a single-word length data word on data bus 109, a double-word length address on address bus 108, and a write signal on control bus 107. Error detection of data calculations is done by performing identical operations on identical data and comparing the results. The data to be written into memory 110 is calculated in ALU/registers 102 and 103 and is transmitted on buses 114 and 113, respectively. Error detection circuit 104 compares the data being transmitted on buses 114 and 113 and indicates an error if a mismatch occurs.

The address for a memory operation is obtained by performing two calculations in ALU/registers 102 and 103 in parallel. The calculations may be a simple increment operation involving only one pair of registers in both ALU/registers 102 and 103, or a complex operation such as an add involving two pairs of registers in both ALU/registers 102 and 103. Error detection of these address calculations is done by doing the calculations twice, computing parity over each calculated address, and matching the resulting parity of the two calculations. Address calculations involve the generation of a double-word operand having a least significant word and a most significant word. Each ALU/register performs the necessary calculation on only one word of the double-word operand. During the first calculation, ALU/register 103 performs the calculation on the least significant word of the address; and ALU/register 102 performs the calculation on the most significant word of the address. The results of the first calculation are transmitted to memory address register 105 via bus 113 and bus 114, respectively. At the end of this first calculation, error detection circuit 104 generates and stores a parity bit for the data on bus 113 as well as a parity bit for the data on bus 114. During the second calculation, ALU/register 103 performs the calculation on the most significant word of the address, and ALU/register 102 performs the calculation on the least significant word of the address. At the end of the second calculation, error detection circuit 104 generates a parity bit for the data on bus 113 and compares this parity bit against the stored parity bit for bus 114. Simultaneously, error detection circuit 104 generates a parity bit for bus 114 and compares this parity bit against the stored parity bit for bus 113. If the parity bits from the first calculation do not match the parity bits from the second calculation, an error signal is transmitted to microsequencer 101. A potential drawback of doing error detection using two calculations is that the processor's throughput will be reduced. Processor 100 avoids that result by performing the second address calculation during the access time of memory 110, therefore, no time is lost due to the performance of the second address calculation. If an error occurs, the memory operation is aborted.

Figure 2:
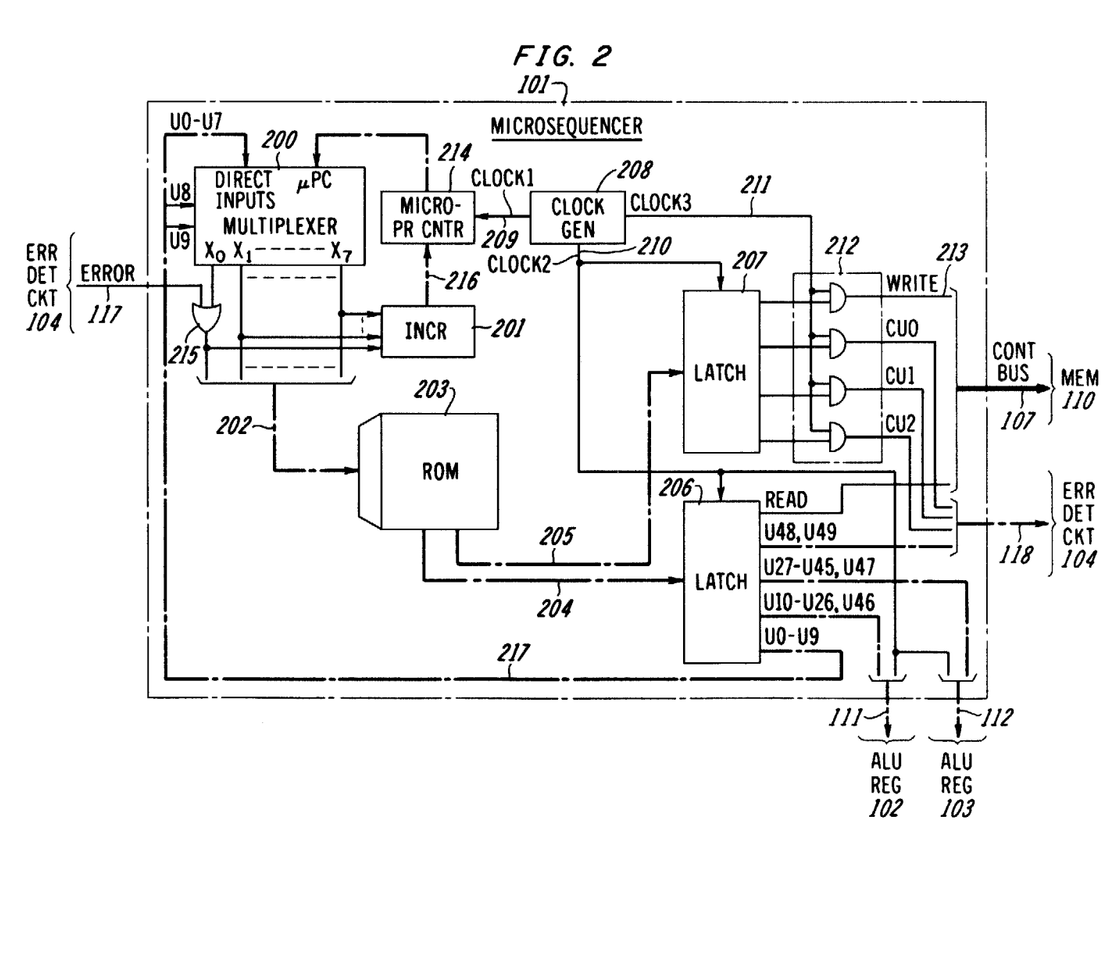
FIG. 2 is a block diagram of a microsequencer included in the processor of FIG. 1.

Microsequencer 101 is shown in greater detail in FIG. 2 and is a microprogram controlled sequencer which generates all the necessary timing and control signals for processor 100. Microsequencer 101 generates these signals by executing a program stored in the form of microwords in read-only-memory (ROM) 203. Each microword in ROM 203 contains microdata bits which control the sequencing of the microprogram and microdata bits which supply the necessary signals to the remainder of processor 100. All microdata bits read from ROM 203 are transmitted to multibit latches 206 and 207 via cables 204 and 205, respectively. The binary states of the first ten stored microdata bits are transmitted via cable 217 from the appropriate outputs of latch 205 as signals U0 through U9 to multiplexor 200 which controls the execution sequence of the microprogram. The binary states of the remainder of the microdata bits stored in latch 206 are transmitted from the appropriate outputs of latch 206 via cables 111, 112, 118, and 107 to the other elements of processor 100 and memory 110. Signals representing the binary states of the microdata bits stored in latch 207 are ANDed in buffer 212 with a signal on conductor 211 from clock generator 208 to produce the necessary timing signals which are transmitted via cables 118 and 107 for use by processor 100 and memory 110.

Figure 3:
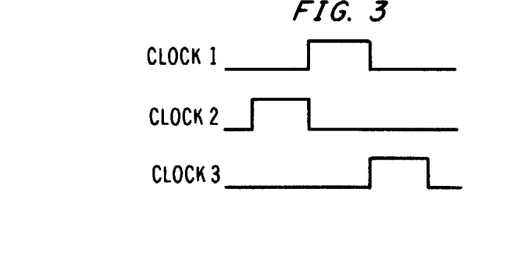
FIG. 3 is a diagrammatical representation of a number of clock pulses generated by a clock generator of the microsequencer of FIG. 2.

With respect to the generation of micro-addresses for ROM 203, microsequencer 101 has the ability to execute an increment to the next micro instruction, to execute an unconditional jump, or to execute a test and skip. Micro-address generation is performed by multiplexor 200 in combination with OR gate 215. The micro-address is selected from either the next address field of the microword (signals U0 through U7) or the contents of microprogram counter 214 and transmitted on cable 202 to ROM 203. This selection is controlled by signals U8 and U9. If an unconditional jump is to be executed, multiplexor 200 selects the micro-address from the next address field of the micro instruction. This allows an unconditional jump to any location within ROM 203. If the next sequential microprogram instruction is to be accessed, multiplexor 200 selects microprogram counter register 214, which contains the micro-address of the next micro-instruction. Microprogram counter register 214 reads the micro address of the next sequential microprogram instruction from incrementor 201 via cable 216 and stores this micro-address internally on the rising edge of the clock-1 signal on conductor 209 as defined in FIG. 3. Incrementor 201 generates the micro-address of the next micro-instruction by adding a "1" to the address generated by multiplexor 200 on cable 202. The test and skip microprogram instruction is executed by testing the error signal on conductor 117 which is connected to the OR gate 215 as an input. If the error signal is present, the next sequential instruction is skipped; however, if the error signal is not present, the next sequential instruction is executed. The test and skip microprogram instruction is always executed at an even address which means the X0 output of multiplexor 200 is a "0". The X0 output and error signal which is transmitted via conductor 117 are ORed together by OR gate 215 whose output is transmitted via cable 202 to incrementor 201. If conductor 117 is transmitting a "0", the next sequential microaddress is loaded into microprogram counter register 214; but if conductor 117 is transmitting a "1", the second next sequential micro-address is loaded into microprogram counter register 214.

Figure 4:
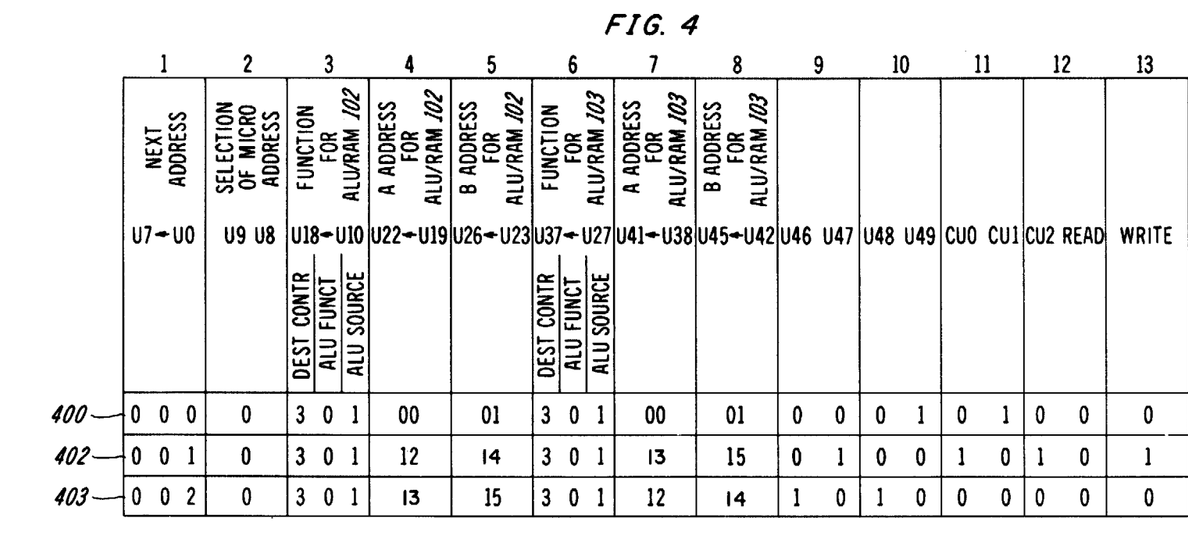
FIG. 4 is a tabular representation of three microwords stored in a read-only-memory of the microsequencer of FIG. 2.

The relationship of the control signals such as signals U0 through U9 to the outputs of latch 206 and buffer 212 is shown in tabular form in FIG. 4. To provide control pulses which are determined by microdata bits, each bit of latch 207 is ANDed by buffer 212 with the clock-3 signal which is transmitted via conductor 211. For example, when a "1" is stored in the bit position of latch 207 associated with conductor 213, buffer 212 transmits a pulse on conductor 213 coincident with the pulse shown for the clock-3 signal of FIG. 3. The other outputs of buffer 212 function in the same manner.

Figure 5:
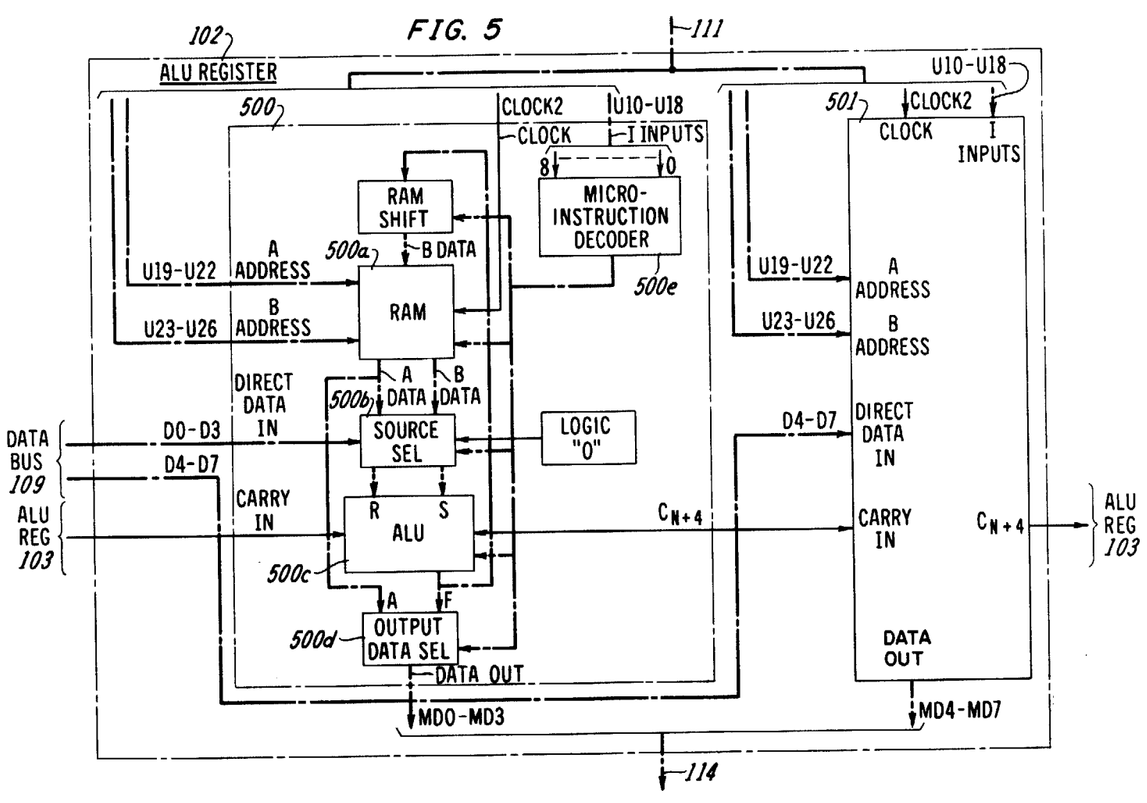
FIG. 5 is a more detailed representation of an ALU/register included in the processor of FIG. 1.
Figure 6:
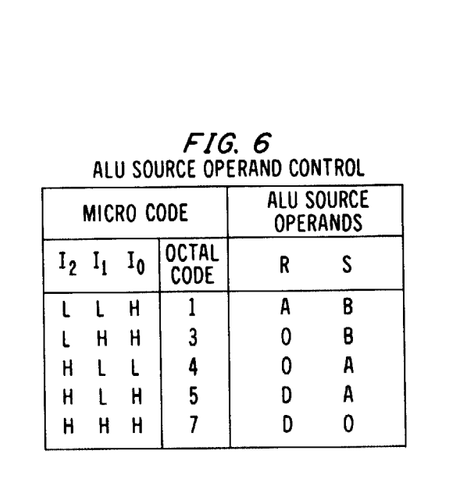
FIGS. 6 through 9 are tables defining control functions for the ALU/register of FIG. 5.
Figure 7:
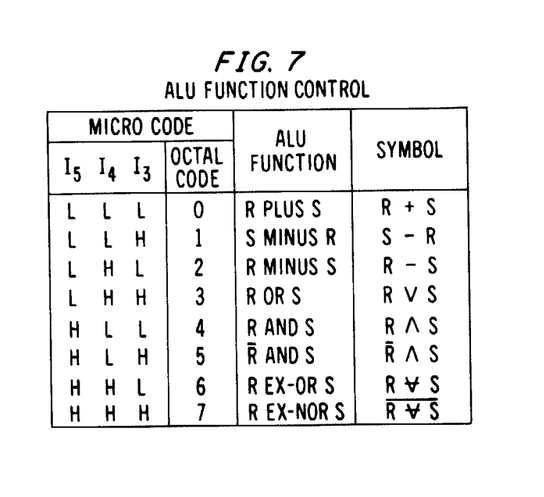
Figure 8:
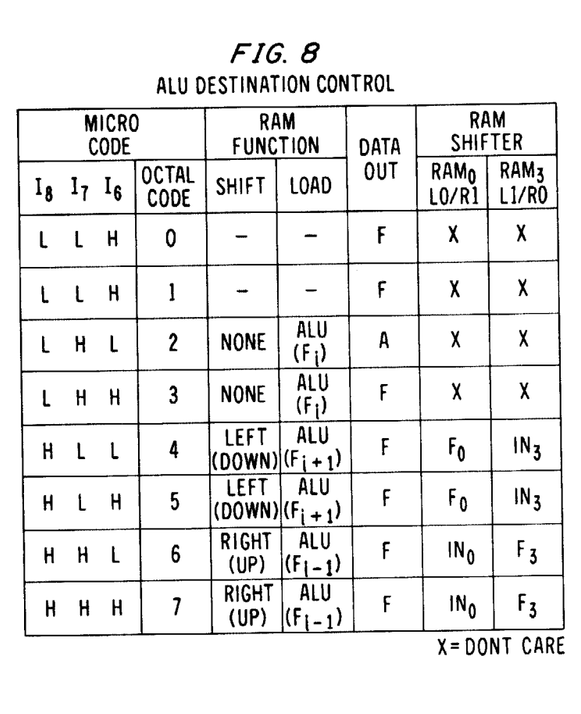
Figure 9:
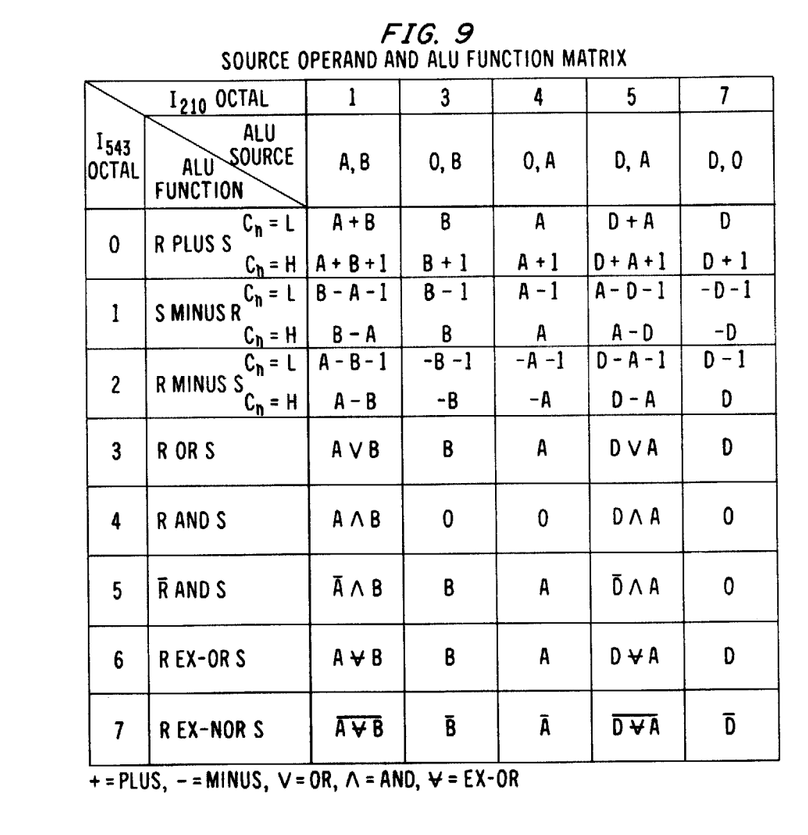

ALU/register 102 is shown in greater detail in FIG. 5. As discussed earlier herein, with respect to FIG. 1, ALU/register 103 is similar. Microprocessor bit slices 500 and 501 may advantageously be a device similar to Advanced Micro Device's AM2901 integrated circuit. The AM2901 is a 4-bit bipolar microprocessor bit slice which is more completely described in the article entitled "How Bit-slice Families Compare: Part 1 Evaluating Processor Elements", *Electronic*, Vol. 15, No. 16, page 91, Aug. 3, 1978. In this illustrated embodiment, microprocessor bit slice 500 may contain a random access memory, RAM 500-a, which contains sixteen 4-bit registers and an arithmetic logic unit, ALU 500-c. RAM 500-a is simultaneously read by the A address inputs and the B address inputs with the accessed word transmitted from the A data-out terminals and the B data-out terminals, respectively. RAM 500-a is written with the data on the B data-in terminals at the location addressed by the B address. The transfer of data from the B data-in terminals to the memory location addressed by the B address occurs on the rising edge of the clock-2 signal as defined in FIG. 3. Microprocessor bit slice 500 is controlled by the U10 through U18 signals transmitted via cable 111 which are connected to the I0 through I8 inputs. Micro-instruction decoder 500-e decodes these inputs to control elements 500-a through 500-d as defined by FIGS. 6 through 9. RAM 500-a is written as defined by FIG. 8. For example, if the U16 through U18 signals which control I6 through I8 inputs of microprocessor bit slices 500 and 501, are in the $011_2$ state (decimal 3), the output of ALU 500-c is loaded into RAM 500-a. ALU data source selector 500-b selects the data to be presented to the ALU 500-c as defined by FIG. 6. ALU 500-c performs the arithmetic logic functions as defined by FIG. 7. The data to be transmitted on bus 114 is selected by output selector 500-d as defined by FIG. 8.

The operation of microprocessor bit slice 500 is described by the following example. A micro-instruction which adds register 0 (R0) and register 1 (R1) of RAM 500-a and writes the result back into R1 is shown on line 400 of FIG. 4. In addition, the result is transmitted by output data selector 500-d to bus 114. R0 is addressed by the A address (column 4), and R1 is addressed by the B address (column 5). In column 3, the ALU source is a "1" which causes the A data-out and the B data-out terminals to be used by the ALU 500-c, the ALU function is a "0" which causes an addition to take place in ALU 500-c, and the destination control is a "3" which causes the result to be written into R1 of RAM 500-a and to be transmitted on the data-out terminal of output data selector 500-d. Since microprocessor bit slice 501 is connected to all the control inputs just described, microprocessor bit slice 501 also performs the previously described operations. In addition, columns 6, 7, and 8 which define the operations for ALU/register 103 are identical to ALU/register 102; and ALU/register 103 performs the same operations as ALU/register 102 for line 400.

Figure 10:
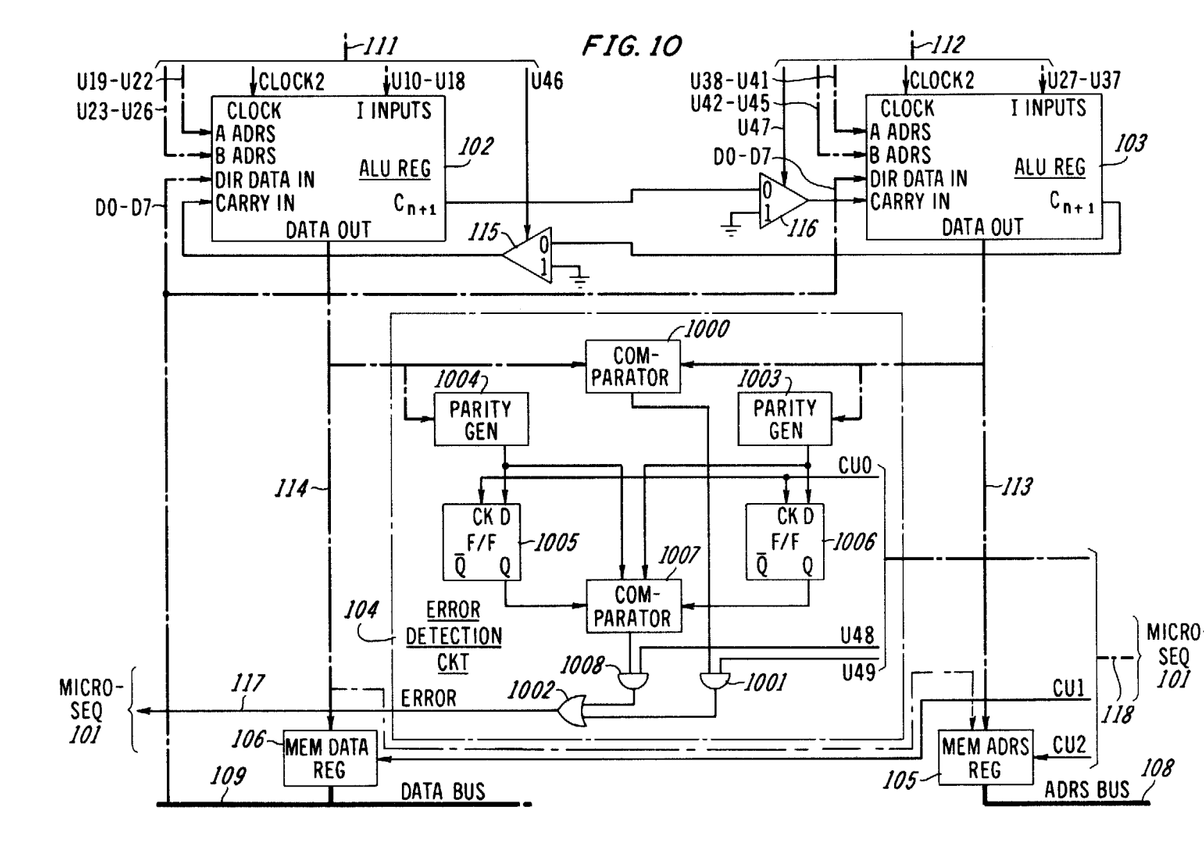
FIG. 10 is a more detailed representation of an error detection circuit included in the processor of FIG. 1.
Figure 11:
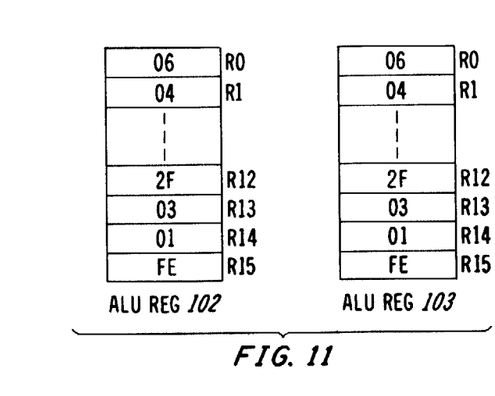
FIGS. 11 through 14 are tables defining the contents of registers of the ALU/register of FIG. 5.
Figure 12:
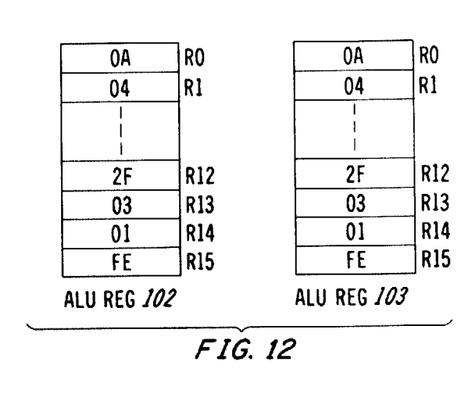
Figure 13:
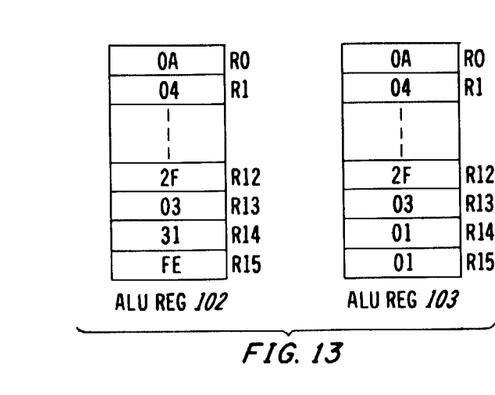
Figure 14:
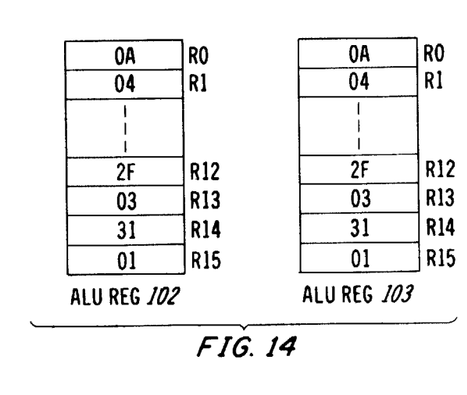

Error detection circuit 104 is shown in greater detail in FIG. 10 along with ALU/register 102 and ALU/register 103. The operation of error detection circuit 104 will be better understood by considering the movement of data and addresses from two points of view—contents of the registers and relationship of the hardware and the micro-instructions. One function which may be performed by processor 100 is to write the sum of the contents of register 0 (R0) and register 1 (R1) into the location defined by the address obtained by adding the double-word operand contained in register 12 (R12) and register 13 (R13) to the double-word operand contained in register 14 (R14) and register 15 (R15). R12 and R14 contain most significant words, and R13 and R15 contain least significant words. The example is first explained from the point of view of the contents of the registers. At each step of the function, the contents of the registers in hexadecimal notation are shown in FIG. 11 through FIG. 14. The initial state of the registers is shown in FIG. 11. First, R0 and R1 of both ALU/registers 102 and 103 are added together; and the sum is transmitted to memory data register 106 and written into R0 of both ALU/registers 102 and 103. FIG. 12 shows the state of the registers at the end of this first operation. Second, R13 and R15 of ALU/registers 103 are added together, and the result is written into R15 and the eight least significant bits of memory address register 105. Simultaneously, with the operation on ALU/registers 103, R12 and R14 of ALU/register 102 are added together. The resulting sum is written into R14 and the eight most significant bits of memory address register 105. FIG. 13 shows the state of the registers at the end of this second operation. Finally, R12 and R14 of ALU/register 103 are added together, and the sum is written into R14. Simultaneously, with the operation on ALU/register 103, R13 and R15 of ALU/register 102 are added together; and the sum written into R15. FIG. 14 shows the final state of ALU/registers 102 and 103. One double-word operand is represented by R13 and R15 of both ALU/registers 102 and 103, and the other double-word operand is contained in R12 and R14 of both ALU/registers 102 and 103.

This example will now be described from the point of view of the circuit of FIG. 10 and the micro-instructions of FIG. 4. The addition of R0 and R1 with the result being placed back into R0 and memory address register 105 has been described with respect to FIG. 5.

The circuit description of the addition of the double-word operand contained in R12 and R13 to the double-word operand contained in R14 and R15 is now described. This part of the example is implemented by the microcode instructions shown as line 402 and line 403, FIG. 4. As shown in line 402, R12 and R14 of ALU/register 102 and R13 and R15 of ALU/register 103 are selected to be added together. The transmission of the carry from ALU/register 103 to ALU/register 102 is accomplished by data selector 115 and 116 which are controlled by signals U46 and U47 being a "0" and "1", respectively. The result is written back into R14 of ALU/register 102 because the destination control address defined by column 3 is a "3" which causes the B address (as defined by column 5) to address the RAM. The result of ALU/register 103 is written into R15, again because the destination control of column 6 is a "3" and column 8 addresses R15. The results of the addition in both ALU/register 102 and 103 is placed on buses 114 and 113, respectively. The contents of buses 113 and 114 are clocked into address register 105 on clock-3 pulse of FIG. 3 because the CU2 signal is generated when column 12 containing a "1". Memory 110 is written by this micro-instruction because column 13 is a "1" which causes a write signal to be transmitted on conductor 213 to memory 110 coincident with clock-3 pulse of FIG. 3. When the results of the addition operation are transmitted on buses 113 and 114, parity generator 1004 and parity generator 1003, which are well-known parity generators, generate odd parity bits for the information on buses 114 and 113, respectively. The CU0 signal is generated by column 11 being a "1" which clocks the parity bit of parity generator 1004 into D flip-flop 1005 and the parity bit generated by parity generator 1003 into D flip-flop 1006.

The last part of the example is defined by the microcode instruction shown on line 403 in FIG. 4. The transmission of the carry from ALU/register 102 to ALU/register 103 is accomplished by data selectors 115 and 116 which are controlled by signals U46 and U47 being a "1" and a "0", respectively. Now, ALU/register 103 performs the addition of R12 and R14, and ALU/register 102 performs the addition of R13 and R15. The results are transmitted on buses 114 and 113, and parity generators 1004 and 1003 generate odd parity bits. Comparator 1007, which of a well-known type, compares the contents of D flip-flop 1005 with the output of parity generator 1003 and the output of D flip-flop 1006 with the output of parity generator 1004. If comparator 1007 detects a mismatch, it transmits a "1" to AND gate 1008. Since the other input of AND gate 1008 is enabled by signal U48 which is generated by column 10 containing a binary "10", AND gate 1008 transmits a "1" to OR gate 1002. When OR gate 1002 receives a "1", it transmits a "1" on conductor 117 (error signal) which is used in conjunction with the test and skip micro-instruction.

It is to be understood that the above-described embodiment is merely illustrative of the principles of the invention and that other arrangements may be devised by those skilled in the art without departing from the spirit and scope of the invention.

What is claimed is:

1. A data processing arrangement comprising:
logic means (102, 103) for storing first and third identical operands each having a least significant word and a most significant word and second and fourth identical operands each having a least significant word and a most significant word and for performing arithmetic operations on said operands, and error word generating means (104) connected to said logic means, characterized in that said logic means is responsive to a first control signal to perform an arithmetic operation on said least significant words of said first and second operands and to perform said arithmetic operation on said most significant words of said third and fourth operands and to generate corresponding first and second output words, and responsive to a second control signal for performing said arithmetic operation on said most significant worse of said first and second operands and for performing said arithmetic operation on said least significant words of said third and fourth operands and for generating corresponding third and fourth output words;

said error word generating means being responsive to said first and said second output words to generate and store corresponding first and second error words and responsive to said third and said fourth output words to generate corresponding third and fourth error words; and said arrangement further comprising compare means (1007) for comparing said third error word with said stored second error word and for comparing said fourth error word with said stored first error word and for generating an error signal if a mismatch occurs.

2. A data processing arrangement in accordance with claim 1 further characterized in that said logic means further comprises a first set of word registers (103, 500-a) for storing said first and second operands and a second set of word registers (102, 500-a) for storing said third and fourth operands.

3. A data processing arrangement in accordance with claim 2 further characterized in that said logic means comprises a first arithmetic unit (103, 500-c) connected to said first set of word registers and a second arithmetic unit (102, 500-c) connected to said second set of word registers; and said first and said second set of registers responsive to said first control signal to access and to transmit said least significant words of said first and second operands to said first arithmetic unit and said most significant words of said third and fourth operands to said second arithmetic unit, respectively, and said first and said second set of word registers responsive to said second control signal to access and to transmit said most significant words of said first and second operands to said first arithmetic unit and said least significant words of said third and fourth operands to said second arithmetic unit, respectively.

4. A data processing arrangement in accordance with claim 3 further characterized in that said first and said second arithmetic units each have a carry input terminal and a carry output terminal; and said logic means further comprises a carry multiplexor (115, 116) responsive to said first control signal to interconnect said carry output terminal of said first arithmetic unit to said carry input terminal of said second arithmetic unit, and responsive to said second control signal to interconnect said carry output terminal of said second arithmetic unit to said carry input terminal of said first arithmetic unit.

5. A data processing arrangement in accordance with claim 4 further characterized in that said carry multiplexor comprises a first data selector (116), having an input terminal connected to said carry output terminal of said first arithmetic unit and an output terminal connected to said carry input terminal of said second arithmetic unit and responsive to said first control signal to interconnect said carry output terminal of said first arithmetic unit to said carry input terminal of said second arithmetic unit (103); and a second data selector (115) having an input terminal connected to said carry output terminal of said second arithmetic unit and an output terminal connected to said carry input terminal of said first arithmetic unit and responsive to said second control signal to interconnect said carry output terminal of said second arithmetic unit to said carry input terminal of said first arithmetic unit.

6. A data processing arrangement in accordance with claim 3 further characterized in that said error word generating means (104) further comprises a first and a second error generator (1003, 1004); and said first error generator is connected to said first arithmetic unit to generate said first and said third error word, and said second error generator is connected to said second arithmetic unit to generate said second and said fourth error words.

7. A data processing arrangement in accordance with claim 6 further characterized in that said first and said second error generators (1003, 1004) are parity generators, and said first, said second, said third and said fourth error words are each composed of one parity bit.

* * * * *